United States Patent
Shepherd et al.

(10) Patent No.: US 7,814,930 B1
(45) Date of Patent: Oct. 19, 2010

(54) REFILL CONTROL MECHANISM FOR A LIQUID HOLDING TANK

(75) Inventors: Richard J. Shepherd, Cape Coral, FL (US); Daniel A. Klein, Middleton, WI (US)

(73) Assignee: Action Manufacturing & Supply, Inc., Cape Coral, FL (US)

( * ) Notice: Subject to any disclaimer, the term of this patent is extended or adjusted under 35 U.S.C. 154(b) by 1052 days.

(21) Appl. No.: 11/540,209

(22) Filed: Sep. 29, 2006

(51) Int. Cl.
*F16K 31/18* (2006.01)
(52) U.S. Cl. .................. 137/413; 137/397; 137/426
(58) Field of Classification Search .......... 137/391, 137/393, 397, 398, 413, 423, 426
See application file for complete search history.

(56) References Cited

U.S. PATENT DOCUMENTS

| | | | | |
|---|---|---|---|---|
| 1,132,833 A | * | 3/1915 | Coseo | 137/398 |
| 1,188,535 A | * | 6/1916 | Ellis | 137/426 |
| 1,600,162 A | * | 9/1926 | Browne | 73/322.5 |
| 2,037,245 A | * | 4/1936 | Leifheit et al. | 96/159 |
| 2,314,158 A | * | 3/1943 | Peters | 137/398 |

* cited by examiner

*Primary Examiner*—John Rivell
*Assistant Examiner*—Craig M Schneider
(74) *Attorney, Agent, or Firm*—William E. Noonan (57) ABSTRACT

A liquid refill control for a holding tank includes a pneumatic solenoid valve for delivering liquid to the tank in an open state and restricting delivery of the liquid to the tank in a closed state. The solenoid valve has a pneumatic exhaust. A container mounted in the tank includes an inlet for introducing liquid from the tank into the container and an outlet formed below the inlet. A discharge valve is operably mounted to the tank for alternately closing and opening the outlet. A lower float closes the discharge valve when the liquid is at or above a predetermined level in the tank and opens the discharge valve when the liquid is below the predetermined level to discharge liquid from the container. A pneumatic exhaust valve alternately opens and closes the pneumatic exhaust which in turn changes the state of the pneumatic solenoid valve. An upper float mounted in the container maintains the pneumatic exhaust valve in one of the open and closed conditions when the liquid in the container is at or above a threshold level and maintains that valve in the other condition when the liquid in the container is below the threshold level.

20 Claims, 6 Drawing Sheets

REFILL CONTROL MECHANISM FOR A LIQUID HOLDING TANK

FIELD OF THE INVENTION

This invention relates to a mechanism for automatically controlling the addition of a liquid, such as water, to a holding tank. The mechanism may be employed for various liquid holding tanks such as aerated well water tanks, reverse osmosis (R/O) tanks and the like.

BACKGROUND OF THE INVENTION

Water holding tanks are commonly utilized to store well water. Recently, a water holding tank that utilizes a blow-molded construction has been introduced. See our copending patent application Ser. No. 10/794,013. Periodically, water must be added to the holding tank in order to refill the tank and/or to aerate the water in the tank so that it is safe for drinking. Most known holding tanks employ an electrically operated solenoid valve that is opened as needed to introduce water to the tank. This type of valve has caused maintenance and repair problems. Governmental codes presently require the electrical solenoid to employ a ground fault. Because the solenoid is installed in proximity to water, it is susceptible to short-circuiting and malfunction. Frequent, inconvenient and expensive service calls are often required.

SUMMARY OF THE INVENTION

It is therefore an object of the present invention to provide for an improved, nonelectric mechanism for automatically controlling the addition of liquid to a holding tank whenever the liquid in the tank falls below a threshold level.

It is a further object of this invention to provide a liquid refill control mechanism that eliminates the problems that have conventionally resulted from using electric solenoid valves and which particularly eliminates the frequent, expensive and inconvenient ground fault failures commonly exhibited by electric solenoids used in a water holding tank environment.

It is a further object of this invention to provide a water refill control mechanism that requires far fewer service calls than are typically required by most conventional refill control mechanisms.

It is a further object of this invention to provide a refill control mechanism for a liquid holding tank that may be used effectively and efficiently in aerated holding tanks, water treatment tanks, R/O tanks and the like.

This invention results from a realization that a highly reliable and low maintenance refill control mechanism for a liquid holding tank is accomplished by eliminating the standard electric solenoid valve associated with the tank and replacing it with means such as a pneumatic solenoid valve operated by a strictly mechanical control device. This eliminates ground fault failures and attendant costs and delays.

This invention features a mechanism for automatically controlling the addition of liquid to a liquid holding tank when the liquid in the tank drops below a predetermined level. The mechanism includes a pneumatic solenoid valve alternatable between open and closed states for delivering liquid to the tank in the open state and restricting delivery of liquid to the tank in the closed state. The pneumatic solenoid valve has a pneumatic exhaust that is opened to maintain the solenoid valve in one of the open and closed states and closed to maintain the solenoid valve in the other of the open and closed states. There is a container for mounting in the tank. The container includes an inlet for introducing liquid from the tank into the container, at least when the level of the liquid in the tank is above a lowermost level of the inlet. The container further includes an outlet formed below the inlet. There is a discharge valve operably mounted to the tank for alternately closing and opening the outlet. A lower float is provided for closing the discharge valve when liquid is at or above a predetermined level in the tank. The lower float opens the discharge valve when the liquid is below the predetermined level in the tank to discharge liquid from the container. A pneumatic exhaust valve is alternatable between open and closed conditions for respectively opening and closing the pneumatic exhaust. An upper float is mounted within the container for maintaining the pneumatic exhaust valve in one of the open and closed conditions when the liquid in the container is at or above a threshold level. The upper float maintains the pneumatic exhaust valve in the other of the open and closed conditions when the liquid in the container is below the threshold level.

In a preferred embodiment, the container includes at least one pair of aligned holes for receiving respective rods to mount the container within the tank. The container may include a blow-molded construction. The container may employ a body and a removable lid that is attached an upper portion of the body. The body may carry a flange that depends from a bottom surface of the body and the discharge valve may be pivotally connected to the flange for alternately opening and closing the outlet.

The lower float is preferably connected and annularly adjustable relative to the discharge valve. The angle at which the lower float is attached to the discharge valve is adjusted to select the predetermined level of liquid in the tank.

The pneumatic exhaust valve may be pivotally attached to an interior wall of the container. The container may further have a pneumatic inlet attached thereto and extending through a wall of the container. The pneumatic inlet is communicably interconnected to the pneumatic exhaust of the solenoid valve for introducing air from the pneumatic exhaust when the pneumatic exhaust valve is in the open condition. The upper float is typically angularly adjustable relative to the pneumatic exhaust valve. The angle at which the upper float is attached to the pneumatic exhaust valve is adjusted to select the threshold level of liquid in the container.

A control device in accordance with this invention may also be employed in a reverse osmosis (R/O) holding tank wherein an R/O filter unit delivers filtered water through a conduit to the tank. The conduit is communicably connected to a pressure inlet of a container as described above. The conduit may include a second discharge outlet for delivering water to the tank. When the water in the tank is below a predetermined level, the upper and lower floats drop and fluid pressure in the conduit falls. A pressure sensitive switch connected to the R/O unit responds to the pressure drop and directs the R/O unit to deliver additional filtered water through the conduit into the tank. Eventually the rising water in the tank raises the lower float and closes the discharge valve of the container. The rising water spills into the container through the inlet and raises the upper float until that float closes the pressure relief valve. This causes the back pressure in the conduit and R/O filter unit to increase until the pressure sensitive switch directs the R/O filter unit to discontinue the production of filtered water.

DETAILED DESCRIPTION OF PREFERRED EMBODIMENTS

Other objects, features and advantages will occur from the following description of a preferred embodiment and the accompanying drawings, in which.

Figure 1:
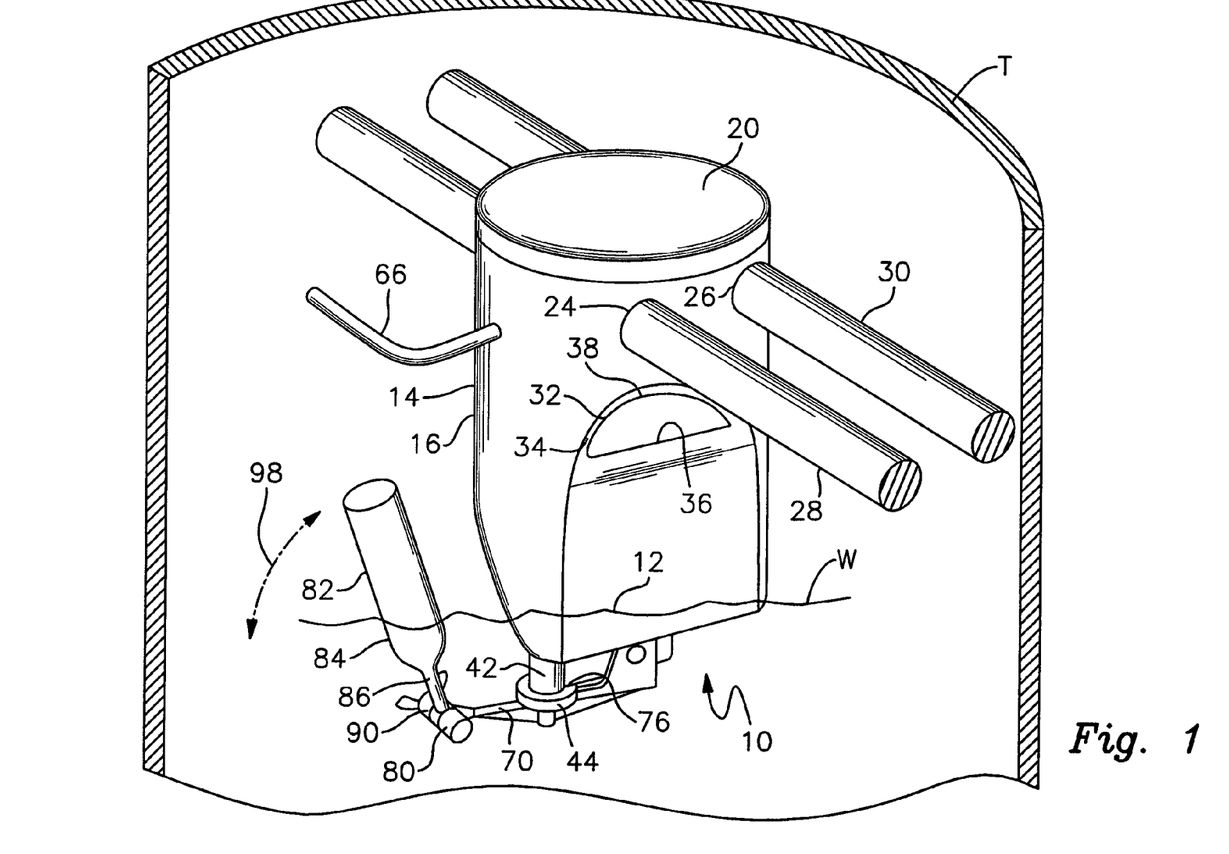
FIG. 1 is a perspective, partially cut away view of a liquid refill control mechanism in accordance with this invention.
Figure 2:
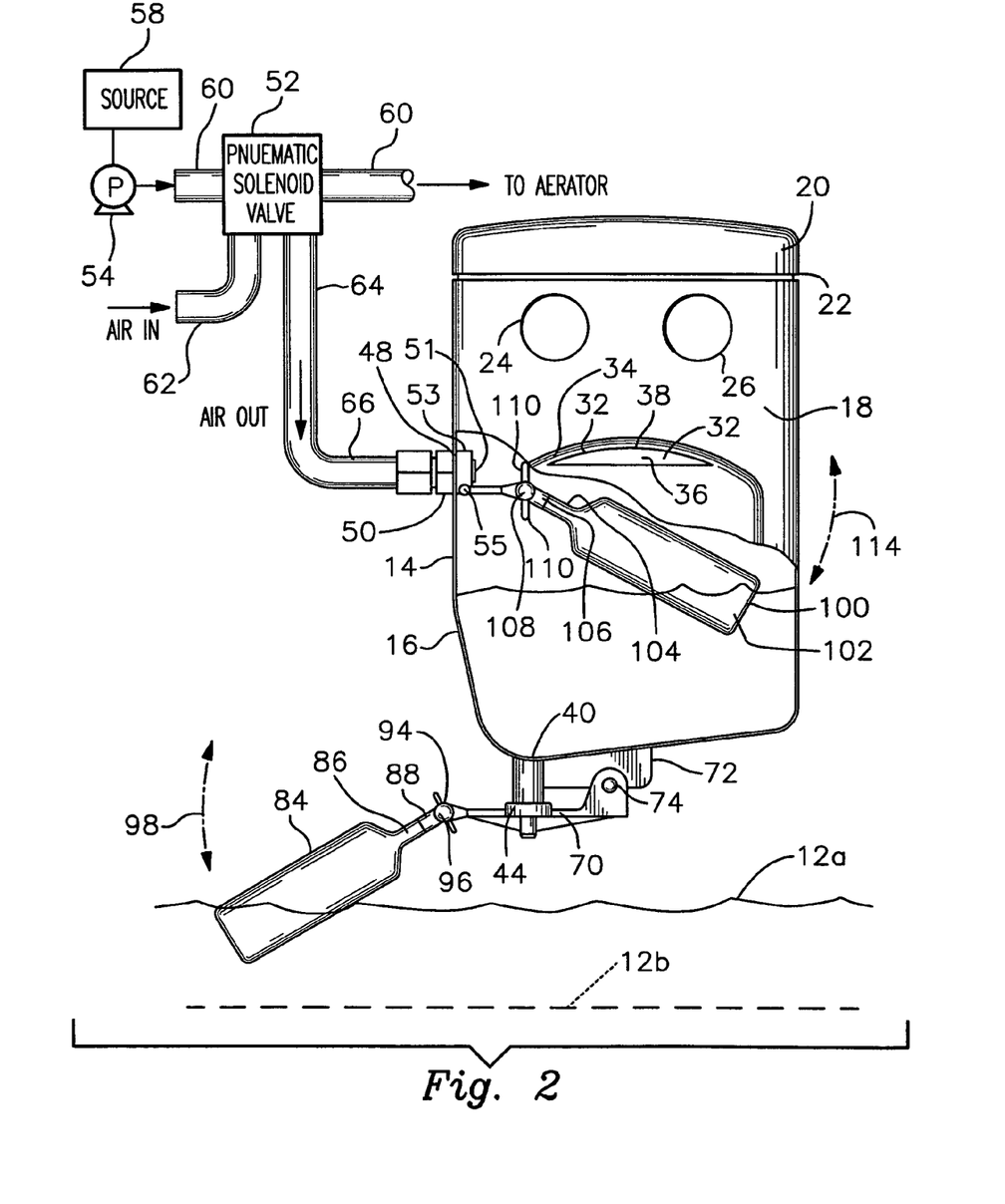
FIG. 2 is an elevational, cut away and partly schematic view of the control mechanism and an operably interconnected pneumatic solenoid valve for introducing water or other liquid into the holding tank with which the mechanism is used.
Figure 3:
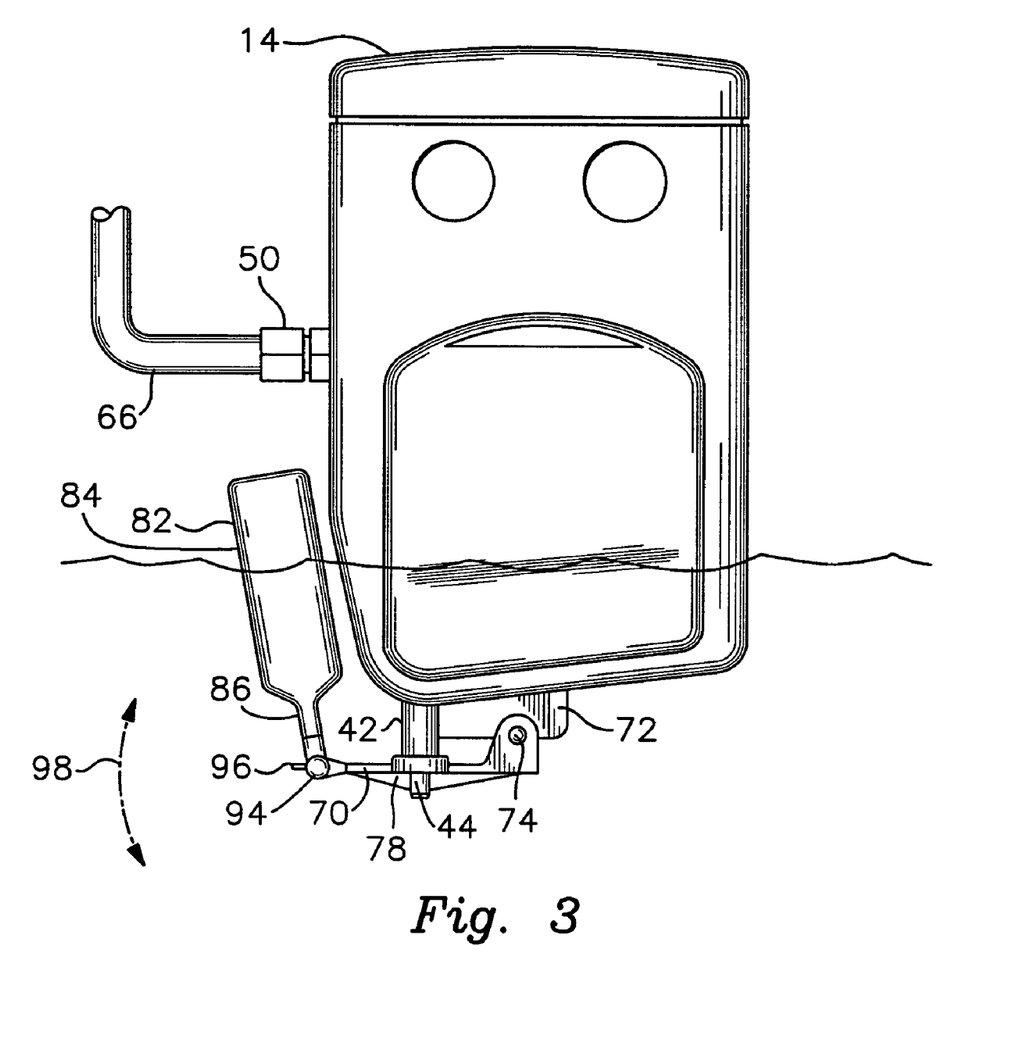
FIG. 3 is an elevational view of the liquid replenishment mechanism with its discharge valve in a closed condition.
Figure 4:
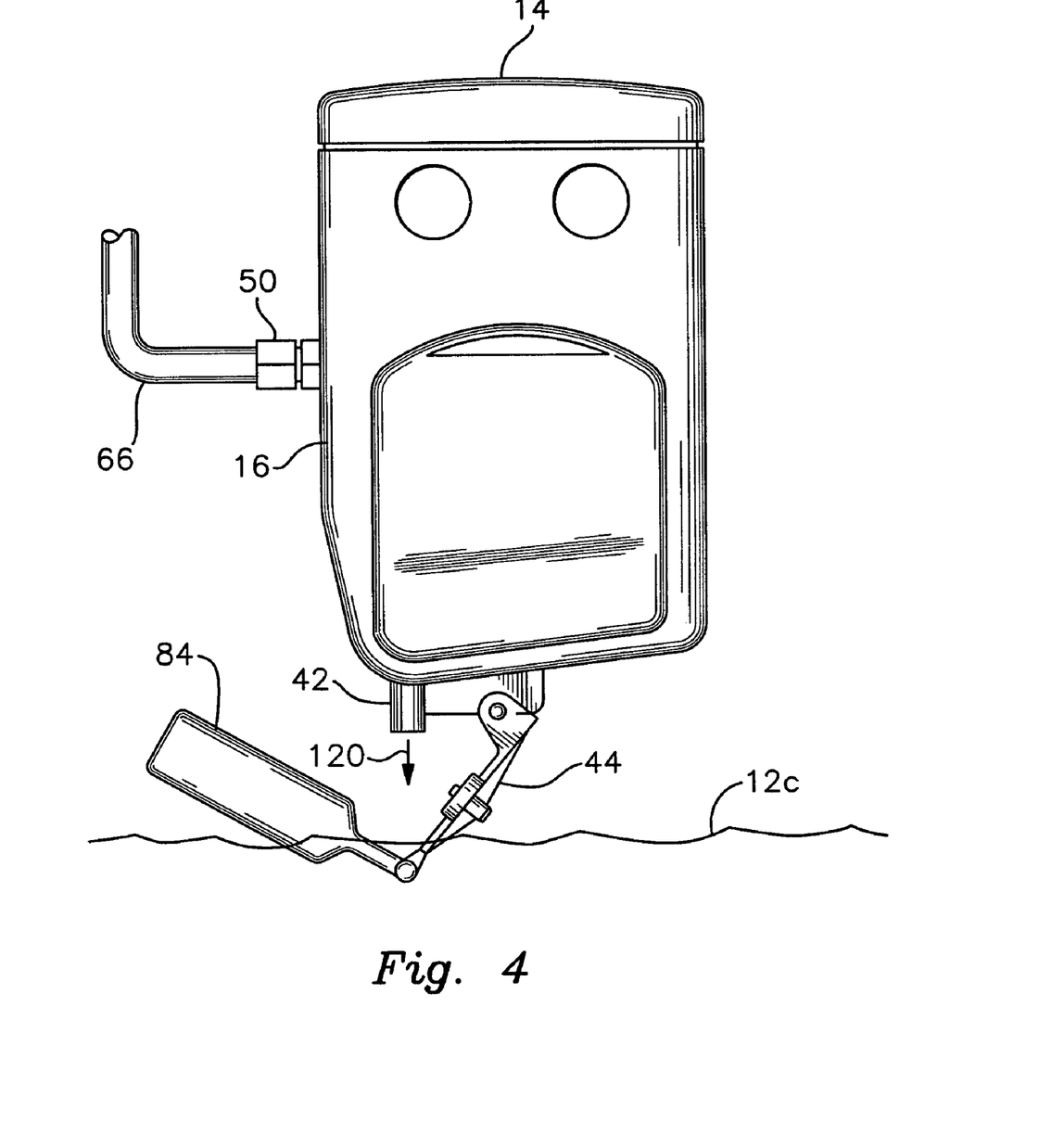
FIG. 4 is a view similar to FIG. 3 with the discharge valve in an open condition.
Figure 5:
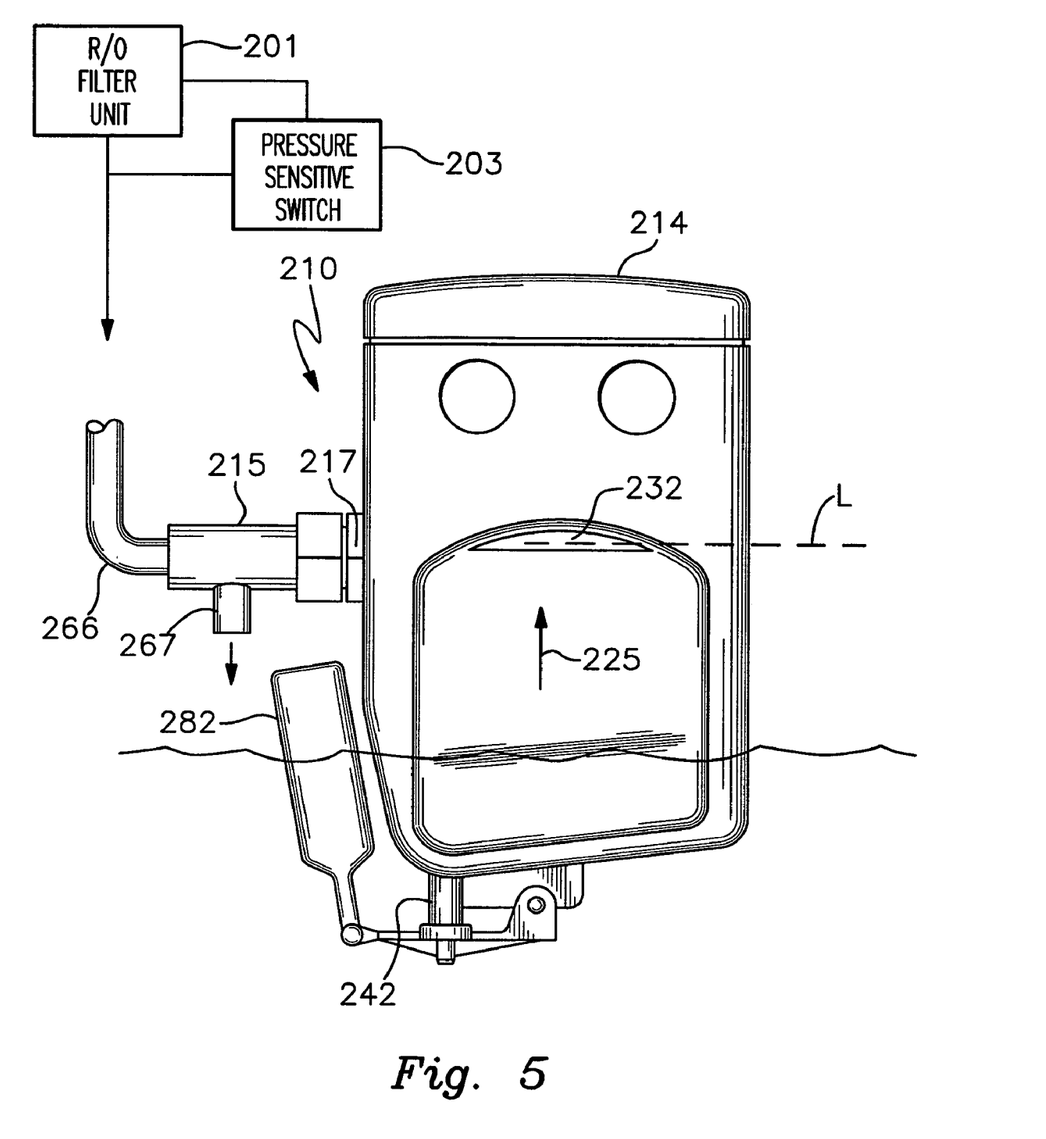
FIGS. 5 and 6 are front elevational views of an alternative mechanism according to this apparatus wherein the mechanism is employed for replenishing water in an R/O tank.

There is shown in FIGS. 1 and 2 a refill control mechanism 10 for automatically maintaining the level of water W in a holding tank T above a predetermined level 12. Tank T may be any type of tank for holding water or other liquids. This may include a well water holding tanks, as shown in FIGS. 1-4 or, alternatively, an R/O tank as depicted in FIG. 5. One representative type of tank that may be employed is disclosed in U.S. patent application Ser. No. 10/794,013 filed Mar. 4, 2004. It should be understood, however, that the invention may be used to control the level of water or other liquid in various other types of holding tanks. The particular type of tank involved is not a limitation of this invention.

In either case, a water replenishing system is provided for adding water to the tank as needed. That system may include an aerator, R/O filter unit and related pumps, valves, solenoids, relays and/or switches that operate in a largely conventional manner. The components of the water replenishing system comprise a part of this invention only in the manner and to the extend described below. As shown in FIG. 1, mechanism 10 includes a plastic container 14 preferably featuring a blow-molded construction. Other types of compositions and constructions may be utilized, although a blow-molded plastic resists corrosion, exhibits a long service life and features the other benefits described in the above referenced patent application. Container 14 includes a generally cylindrical lower body 16 having a interior chamber 18 best depicted in FIG. 2. The chamber has a volume of approximately 2-4 gallons, although this capacity may be varied within the scope of this invention. A lid 20 snugly and sealably engages the open upper end of body 16. More particularly, lid 20 engages a reduced diameter cylindrical flange formed at the upper end of body 16. The lower edge of lid 20 includes an inwardly turned lip 22 that engages and snugly sits within a complementary annular groove formed in the upper flange of body 16.

Body 16 further includes a first pair of aligned holes 24 and a second pair of aligned holes 26 formed through an upper portion of the body. Holes 24 and 26 receive respective mounting rods 28 and 30, which mount container 14 to the interior wall of tank T. More particularly, the rods may be received through respective pairs of aligned holes in the tank or otherwise attached to the walls of the tank by brackets or other means.

A plurality of openings are formed in container body 16. In particular, the container includes an inlet 32 that is formed in a beveled wall 34 of container 14. Inlet 32 includes a horizontal lower edge 36 and an concave upper edge 38, which together define a semi-circular shape resembling an inverted or upside down smile.

A discharge outlet 40 is formed in the bottom surface of base 16. Outlet 40 drains or discharges water from inside container 14 in a manner that will be described more fully below. Outlet 40 communicates with a cylindrical discharge port 42 that is formed integrally with the floor of base 16 and depends therefrom. In FIGS. 1-3, the lower end of discharge port 42 is selectively closed by a discharge valve 44. This component and its function is described more fully below.

An opening 48, FIG. 2, formed in the cylindrical side wall of container base 16 receives a pneumatic pressure inlet fitting 50 that fits through opening 48. This fitting is used to interconnect container 14 to a pneumatic solenoid valve 52 shown in FIG. 2. More particularly, pneumatic solenoid valve 52 replaces the electrical solenoid valve that is conventionally utilized in replenishment or refill systems for water holding tanks. Valve 52 enables water to be added to the tank in a purely mechanical fashion, without requiring electrical components and without encountering the difficulties that typically accompany the use of such electrical components in water refill systems.

It should be understood that each of the individual components, including water pump 54, solenoid valve 52 (shown schematically) and an aerator, not shown, are conventional items. The construction and operation of these components will be understood to persons skilled in the art. Pump 54, which comprises various known types of water pumps is connected to a source of water 58, which may comprise well water. In other embodiments, the pump may be eliminated and a municipal water supply, with water under pressure, may be utilized. In either case, water is delivered through a conduit 60 to an aerator mounted in a conventional manner within holding tank T. Pneumatic solenoid valve 52 is connected to the conduit 60 in a conventional manner such that when the solenoid 52 is opened, water is pumped or otherwise delivered through conduit 60 and to the aerator, which sprays water into tank T. Alternately, when the valve is closed, delivery of water to the tank is restricted.

As previously indicated, valve 52 comprises a standard pneumatic solenoid valve having an air intake 62 and an air exhaust 64. According to known principles, when a certain air pressure is maintained within the solenoid valve, the valve is held in a first (e.g. closed) state. Alternately, if air is exhausted from the valve through exhaust 64, the valve is alternated to a second (e.g. open) state. In this open state, water is delivered through conduits 60 to the aerator. In alternative embodiments, solenoid valve 52 may operate as a normally open valve, i.e. when the valve is pressurized, it is held in an open state and alternately when pressure is released through exhaust 64, the valve is closed. For purposes of the following description, valve 52 should be considered to be normally closed when pressurized. It should be understood, however, the invention will operate equally effectively for pneumatic solenoid valves that are normally opened (i.e. there the solenoid valve opens when depressurized and closes when pressurized).

As best shown in FIG. 2, the interior end of fitting 50 disposed within container chamber 18 is selectively closed and opened by a pneumatic relief or exhaust valve 51 that is pivotally connected to a mounting bracket 53 secured to the inside wall of container body 16. More particularly, bracket 53 may be threadably interengaged with an inner end of inlet fitting 50. Pneumatic exhaust valve 51 is pivotally attached to bracket 53 such as by a cotter pin or other type of pivot pin 55.

Pneumatic exhaust 64 typically includes an elongate hose or conduit 66, FIGS. 1-3, that is communicably connected to pneumatic inlet fitting 50 extending through the cylindrical side wall of container body 16. As previously described, the interior end of fitting 50 is disposed within chamber 18 of container body 16 and is alternately closed and opened by pivoting pneumatic exhaust valve 51.

Each of the pneumatic exhaust valve 51 and discharge valve 44 is connected to and actuated by a respective float element. In particular, valve 44 is attached integrally to an elongate arm 70, which is itself pivotally attached to a flange 72 depending from the bottom surface of container base 16. Arm 70 is connected to flange 72 by a pivot pin 74 that is itself held in place within an opening of the flange by a cotter pin, not shown. Valve 44 is formed integrally with arm 70 and may carry an elastomeric seal 76 (FIG. 1) that seats against the lower end of discharge port 42 when the valve is in the closed condition shown in FIGS. 1-3. An elongate rib 78 or gusset may be unitarily connected to arm 70 for strengthening the arm.

A distal end of arm 70 carries a cylindrical bushing 80, FIG. 1. A lower float 82 preferably composed of a lightweight floatable plastic, is attached to bushing 80 and angularly adjustable with respect to arm 70. Float 82 includes an elongate, floatable and generally hollow bottle-shaped element 84, which has a generally cylindrical stem 86 extending from its lower end. The stem receives a plastic element 88 that is attached to a second bushing 90 positioned adjacent to and axially aligned with bushing 80. Each of the bushings 80 and 90 includes a central opening. These openings are aligned and interengaged by a screw 94, FIG. 2. A wing nut 96 is attached to the screw after it is interengaged with the aligned openings of bushings 80 and 90. This secures float 82 to the distal end of arm 70. This form of interconnection also allows bottle-shaped float element 84 to be angularly adjusted relative to arm 70 and attached valve 44 as indicated by doubleheaded arrow 98. The angle of the float element is changed by simply loosening wing nut 96 and pivoting float element 84 into a desired angular orientation with respect to arm 70. This angle is selected to provide a predetermined minimum level 12, 12a for the water W in tank T. When the water in the tank falls below that level, the control device operates automatically, as described below, to refill the tank to the selected predetermined level. When a higher predetermined water level is desired, the float element 84 is angled upwardly as indicated in FIG. 1. Alternatively, when a lower minimum level 12a is desired as shown in FIG. 2, the float element 84 is angled downwardly. This causes the float element to open and close discharge valve 44 when the water level respectively falls below and rises to a selected and corresponding threshold level within the tank. This operation is described more fully below.

As best shown in FIG. 2, an analogous upper float 100 actuates pneumatic exhaust valve 51. Specifically, float 100 again comprises an elongate, generally bottle-shaped float element 102 that is preferably composed of a blow-molded plastic or other floatable material. A stem 104 extends from float element 102 and receivably interengages a plastic insertion member 106. This insertion member is itself unitarily connected to a bushing that is axially aligned with a second bushing (obscured in FIG. 2). The second bushing is unitarily connected to valve 51. The aligned bushings within container 14 are themselves releasably interconnected by a screw that is inserted through the aligned openings of those bushings. A wing nut 110 is tightened to selectively fasten the bushings together in a locked condition. Alternatively, the wing nut is loosened such that the aligned bushings can pivot relative to one another about the screw on which they are mounted. This allows the angle of float 100 to be angularly adjusted relative to pneumatic fitting 50 as indicated by doubleheaded arrow 114. Float element 102 is set at a desired orientation or angle within container 14 by loosening the wing nut and pivoting element 102 to obtain the desired angle. When this angle is achieved, the wing nut is tightened on the mounting screw and the float element 102 is locked in the desired position. This causes the float to open and close pneumatic exhaust valve 51 when the water within container 14 is either above or below a threshold level 103 of FIG. 2.

Initially, with control device 10 installed in tank T, the angle of float element 84 is set to provide for a selected minimum water level within tank T. In FIGS. 1, 3 and 4, float element 84 is angled upwardly to provide a somewhat higher minimum level. In FIG. 2, the float element is angled to provide for a lower threshold level. By the same token, upper float element 102 is angularly adjusted as desired. If float element 102 is angled downwardly to a greater degree, that float will rise within container 14 and shut off the pneumatic solenoid valve sooner.

In operation, when holding tank T is filled to a level equal to or greater than the lower edge 36 of inlet 32 and chamber 18 of container 14 is filled to at least the selected threshold level 103, float 100 floats upwardly and closes pneumatic exhaust valve 51. Pneumatic exhaust 64 is thereby closed against fitting 50 and pneumatic solenoid valve 52 remains pressurized. A normally closed valve will thereby remain closed. Pump 54 includes a standard pressure switch (not shown) that senses the buildup of pressure in the fluid line. By the same token, submerged float 82 likewise rises to close discharge valve 44 against outlet port 42.

Gradually, water is drawn from the holding tank and the water level drops. As the water level in tank T falls below the lowermost edge 36 of container inlet 32, the water within container 14 nonetheless remains constant at the level of edge 36 so that float element 102 is buoyed to keep valve 51 closed. Eventually, the water level in the tank drops below predetermined level 12, FIGS. 1 and 3, or level 12a, FIG. 2. When the water drops below the predetermined level, i.e. to level 12b in FIG. 2 or level 12c in FIG. 4, lower float 82 drops and opens discharge valve 44. This causes the water within container 14 to be discharged through outlet port 42 and into the tank as indicated by arrow 120. The precise predetermined level below which float 82 drops may vary within the scope of the invention and may be adjusted as described above, by varying the angle of float 82.

As the water in container 14 drains through the discharge port and into the tank, upper float 110 descends gradually along with the water within container 14. Eventually, when float 100 drops below a threshold level within the container, the float pivots pneumatic exhaust valve 51 generally clockwise about pin 55 and thereby opens the pneumatic exhaust valve. This releases air from the pneumatic solenoid valve through exhaust conduit 66. As a result, the normally closed valve 52 is depressurized and opened. The pressure switch in pump 54 reacts to the drop in pressure and the pump is operated to pump water through conduit 60 and open valve 52 to the aerator. The aerator in turn sprays water into the interior of the tank such that the water level rises within the tank. At the same time, the water in the tank is aerated.

When the water level returns from a lower level 12b, 12c to the predetermined level 12, 12a, lower float 84 rises with the water until valve 44 closes discharge port 42. At this point, the chamber 18 of container 14 remains empty. As a result, upper float 100 remains in a lowered condition and pneumatic valve 51 stays open so that the pump continues to add water to the aerator and thereby to the tank. The water level within the tank continues to rise above the predetermined level and eventually rises about 8"-12" until it reaches the level of inlet 32. Water from the tank then spills into the container through inlet 32 and begins to fill the container. Eventually, float 100 rises sufficiently within the deepening water in the tank to reclose pneumatic exhaust valve 51, FIG. 2. (See the closed discharge valve in FIGS. 2 and 3.) The pneumatic exhaust 64 of solenoid valve 52 is again closed and the pneumatic solenoid valve is re-pressurized and turned off. This causes pump 54 to turn off. The cycle is then repeated. As the water level gradually drops, the pneumatic solenoid valve remains closed and the pump remains "off" until the water level drops below threshold level 12 (FIG. 1) or 12a (FIG. 2). Float element 84 then re-opens valve 44, the water in container 14 is emptied and the solenoid valve opens to introduce water through the aerator and into the tank.

Figure 6:
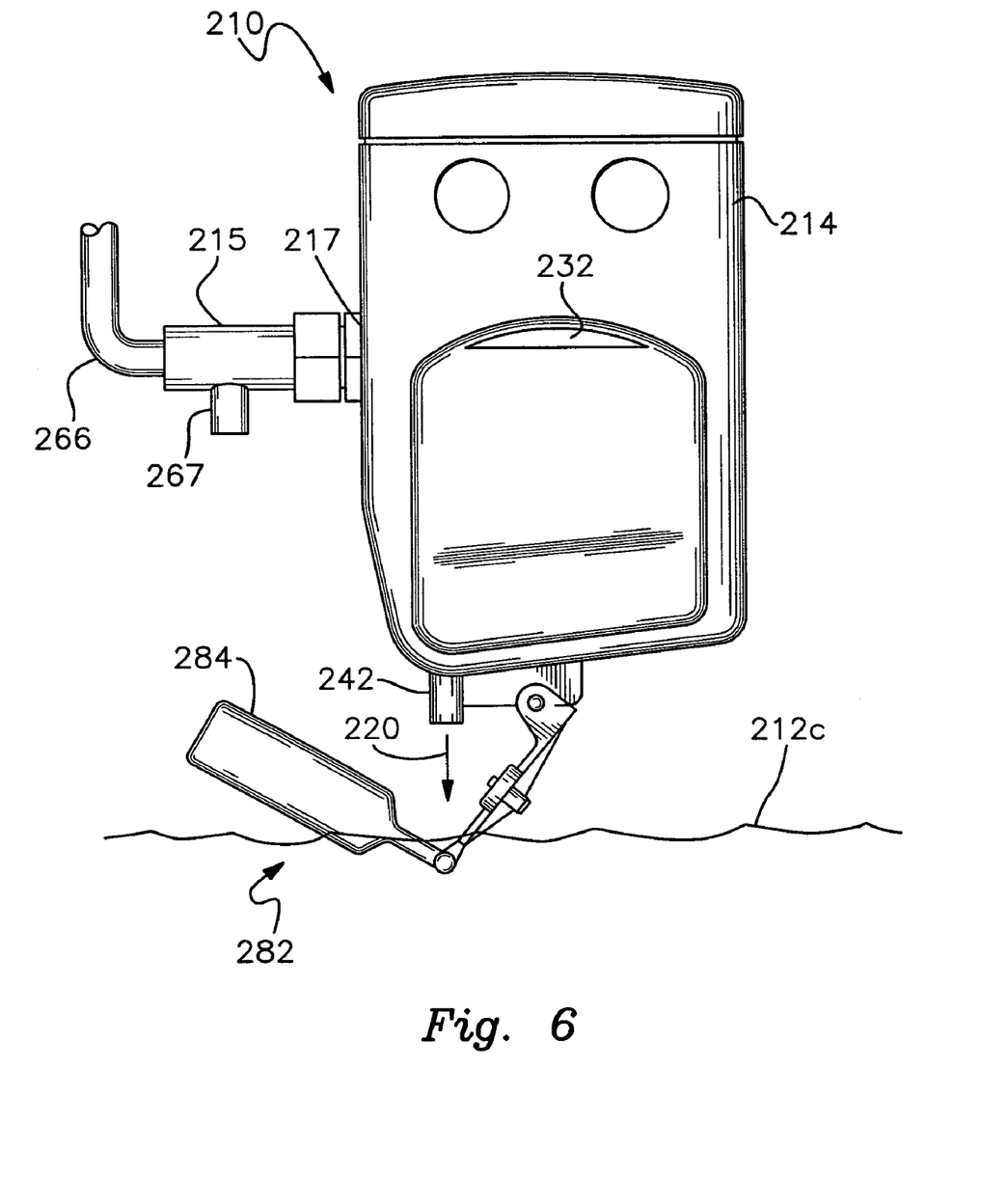

There is shown in FIGS. 5 and 6 a slightly different version of the water refill control mechanism as utilized for an R/O holding tank. Mechanism 210 is constructed virtually identically to the control mechanism in the previously described embodiment. However, in this version, the container 214 is communicably connected to an inlet fitting 215 disposed at the distal end of a filtered water discharge conduit 266. Conduit 266 is itself connected to the outlet of a conventional RIO unit 201 (shown schematically) that is mounted in a conventional manner within a holding tank. As will be known to persons skilled in the art, the R/O unit produces filtered water that is delivered through conduit 266 and is discharged through an outlet 267 into the holding tank. Discharge outlet 267 is formed in fitting 215 but in other versions, the discharge outlet and the fitting connected to container 214 may comprise separate components.

Container 214 of control mechanism 210 is communicably connected through a pressure inlet connected communicably to fitting 215 and conduit 266. Fitting 215 may extend entirely through the circumferential wall of container 214 and the inlet 217 may be located inside the plastic container. Pressure inlet 217 may be integral with (as in the prior embodiment) or separate from fitting 215, but is, in either event, communicative with the fitting. In any event, the controller 210 is otherwise constructed in a manner identical to that disclosed for the previous embodiment. In particular, an interior upper float (not shown) is pivotally mounted within the tank. The upper float operates a diaphragm valve that alternately closes and opens the outlet 217 of fitting 215 in response to the float rising above and dropping below, respectively, a predetermined water level within container 214. Once again, the structure and operation of the interior components within container 214 are analogous to those previously described.

A lower float assembly 282 is likewise secured beneath container 214 in the manner similar to that described above. Float assembly 282 opens and closes a discharge port 242 formed in the floor of container 214.

In operation, when the interior of re-fill container 214 is empty of water and the water in the holding tank is below the lower edge of opening 232, this indicates that additional filtered water is needed within the holding tank. The interior float of controller 210 hangs downwardly within the empty tank so that the pressure relief valve (see valve 51 in FIG. 1) remains open with respect to inlet 217 (which is analogous to inlet fitting 50 in FIG. 1). The RIO unit includes a pressure sensitive switch 23 that fails to detect a build-up of back pressure from water in conduit 266 and/or unit 201. Accordingly, the RIO unit responds by delivering filtered water through conduit 266 and this water is discharged through outlet 267 into the holding tank. This causes the level of water in the tank to rise as indicated by arrow 225.

Eventually, water rises to level L. The water level exceeds the lower edge of opening 232 and spills into the interior of container 214. This eventually causes the interior float to rise as described for the prior embodiment. The float ultimately closes its associated pressure relief valve against pressure inlet 217. This causes a back pressure increase within conduit 266. The pressure sensitive switch 203 in the R/O unit detects this pressure increase and the R/O unit responds by discontinuing the production and delivery of water through conduit 266. The switch typically causes the R/O unit to cease operation when a pressure of approximately 40 pounds is sensed. The selected pressure level may be adjusted within the scope of this invention.

Over time, filtered water is depleted from the holding tank. Eventually, as shown in FIG. 6, the water level drops to a level 212c. At this point, float element 284 drops and opens discharge outlet 242. The water that had previously collected within the interior of container 214 is discharged as indicated by arrow 220. This causes the interior float to drop and open the valve covering inlet 217. The back pressure sensed by the R/O unit drops and the unit resumes the production and delivery of filtered water. This water is discharged through outlet 267. The water level in the tank gradually rises and the cycle is repeated.

The aerator and R/O unit embodiments employ analogous operating principals. In the aerator embodiment, the controller controls operation of a pneumatic solenoid valve. In the R/O unit version, the controller turns on and off an R/O filter unit. The pressure relief valve of the controller (within the container) is able to withstand the water delivered through conduit 266 because that water is delivered with much less pressure and force than is the case with water produced in the aerator version. In the aerator version, the valve associated with the upper float encounters pneumatic pressure only. In either case, the use of failure prone electric solenoids and the need to perform associated ground fault repairs are avoided.

In alternative embodiments, water or other liquid may be delivered to the holding tank by pumps and/or valves using various alternative types of pneumatic solenoid mechanisms. In some versions, a pump may be eliminated and water may be supplied, for example, by a municipal or other pressurized supply through a pneumatic solenoid valve. Pump and pneumatic solenoid constructions may be in accordance with or analogous to assemblies known to those skilled in the art.

Accordingly, the present invention provides for a mechanism that efficiently adds liquid to a holding tank for water or other liquids. The mechanism operates wholly mechanically in conjunction with a pneumatic solenoid valve. Electrical components are largely eliminated. As a result, solenoid malfunctions and expensive service calls are largely avoided.

From the foregoing it may be seen that the apparatus of this invention provides for a mechanism for automatically controlling the addition of a liquid, such as water, to a holding tank. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A mechanism for automatically controlling the addition of liquid to a tank wherein a liquid replenishing system is used to selectively deliver liquid to the tank, the liquid replenishing system having a pressure source, which generates at least one of liquid pressure and pneumatic pressure, said mechanism comprising:

a container for mounting in the tank, which container includes an inlet for introducing liquid into said container, at least when the level of liquid in the tank exceeds a lowermost level of said inlet, said container further including an outlet formed below said inlet;

a discharge valve operably mounted to the container for alternately closing and opening said outlet;

a lower float for closing said discharge valve when liquid is at or above a predetermined level in said tank and for opening said discharge valve when the liquid in said tank is below said predetermined level to discharge liquid from said container;

a pressure inlet in said container for connecting communicably to the pressure source of the liquid replenishing system;

a pressure relief valve alternatable between open and closed conditions for respectively opening and closing said pressure inlet to respectively reduce and increase the pressure generated by the pressure source of the liquid replenishing mechanism; and an upper float mounted within said container for maintaining said pressure relief valve in one of said open and closed conditions when the liquid in said container is at or above a threshold level and for maintaining said pressure relief valve in the other of said open and closed conditions when the liquid in said container is below said threshold level, whereby the pressure generated by the pressure source is respectively increased and when the pressure relief valve is closed and decreased when the pressure relief valve is opened.

2. The mechanism of claim 1 in which said container includes at least one pair of aligned holes for receiving respective rods to mount said container within the tank.

3. The mechanism of claim 1 in which said container includes a blow-molded construction.

4. The mechanism of claim 1 in which said container includes a body and a removable lid attached to an upper portion of said body.

5. The mechanism of claim 1 in which said body carries a flange that depends from a bottom surface of said body and said discharge valve is pivotally connected to said flange for alternately opening and closing said outlet.

6. The mechanism of claim 1 in which said lower float is connected and angularly adjustable relative to said discharge valve, the angle at which said float is attached to said discharge valve being adjusted to select the predetermined level of liquid in said tank.

7. The mechanism of claim 1 in which said pressure relief valve is pivotally attached to an interior wall of said container.

8. The mechanism of claim 7 in which said upper float is attached to said pressure relief valve.

9. The mechanism of claim 8 in which said upper float is angularly adjustable relative to said pneumatic valve, the angle of said upper float being selected to adjust the threshold level of liquid in said container.

10. A mechanism for automatically adding liquid to a liquid holding tank when the liquid in the tank drops below a predetermined level, said mechanism comprising:

a pneumatic solenoid valve alternatable between open and closed states for delivering liquid from a liquid source to the tank in the open state and restricting delivery of the liquid to the tank in the closed state, said solenoid valve having an pneumatic exhaust that is opened to maintain the solenoid valve in one of the open and closed states and closed to maintain the solenoid valve in the other of the open and closed states;

a container for mounting in the tank, which container includes an inlet for introducing liquid from the tank into said container, at least when the level of liquid in the tank exceeds a lowermost level of said inlet, said container further including an outlet formed below said inlet;

a discharge valve operably mounted to the container for alternately closing and opening said outlet;

a lower float for closing said discharge valve when liquid is at or above a predetermined level in said tank and for opening said discharge valve when the liquid is below said predetermined level in the tank to discharge liquid from said container;

a pneumatic exhaust valve alternatable between open and closed conditions for respectively opening and closing the pneumatic exhaust; and an upper float mounted within said container for maintaining said pneumatic exhaust valve in one of said open and closed conditions when the liquid in said container is at or above a threshold level and for maintaining said pneumatic exhaust valve in the other of said open and closed conditions when the liquid in said container is below said threshold level.

11. The mechanism of claim 10 in which said container includes at least one pair of aligned holes for receiving respective rods to mount said container within the tank.

12. The mechanism of claim 10 in which said container includes a blow-molded construction.

13. The mechanism of claim 10 in which said container includes a body and a removable lid attached to an upper portion of said body.

14. The mechanism of claim 10 in which said body carries a flange that depends from a bottom surface of said body and said discharge valve is pivotally connected to said flange for alternately opening and closing said outlet.

15. The mechanism of claim 10 in which said lower float is connected and angularly adjustable relative to said discharge valve, the angle at which said float is attached to said discharge valve being adjusted to select the predetermined level of liquid in said tank.

16. The mechanism of claim 10 in which said pneumatic exhaust valve is pivotally attached to an interior wall of said container.

17. The mechanism of claim 16 in which said container further has a pneumatic inlet attached thereto and extending through a wall of said container, said pneumatic inlet for being communicably interconnected to the pneumatic exhaust to introduce air from the pneumatic exhaust into said container when said pneumatic valve is in the open condition.

18. The mechanism of claim 10 in which said upper float is attached to said pneumatic exhaust valve.

19. The mechanism of claim 18 in which said upper float is angularly adjustable relative to said pneumatic exhaust valve, the angle of said upper float being selected to adjust the threshold level of liquid in said container.

20. A mechanism for automatically controlling the addition of water to an R/O holding tank when the water in the tank drops below a predetermined level, said mechanism comprising:

an R/O filter unit for selectively delivering water from a water source to the tank, said unit having a water discharge conduit extending therefrom and within said tank, said unit further having a pressure sensitive switch for directing said unit to deliver filtered water through said conduit to said tank when the water pressure within said conduit is in a relatively low level and directing said unit to discontinue delivering water through said conduit to said tank when the water pressure in said conduit is at a relatively high level;

a container for mounting in the tank, which container includes an inlet for introducing water from the tank into said container, at least when the level of water in the tank exceeds a lowermost level of said inlet, said container further including an outlet formed below said inlet;

a discharge valve operably mounted to the tank for alternately closing and opening said outlet;

a lower float for closing said discharge valve when liquid is at or above a predetermined level in said tank and for opening said discharge valve when the water is below said predetermined level in the tank to discharge water from said container;

a pressure inlet in said container for connecting communicably to said water discharge conduit;

a pressure relief valve alternatable between open and closed conditions for respectively opening and closing said pressure inlet to respectively reduce and increase the water pressure in said conduit and said R/O filter unit; and an upper float mounted within said container for maintaining said pressure relief valve in one of said open and closed conditions when the water in said container is at or above a threshold level and for maintaining said pressure relief valve in the other of said open and closed conditions when the water is said container is below said threshold level, whereby pressure generated in said conduit and said R/O filter unit is increased when said pressure relief valve is closed and decreased when said pressure relief valve is opened to respectively stop and start operation of said R/O filter unit.

* * * * *